United States Patent [19]
Gramckow et al.

[11] Patent Number: 5,778,151
[45] Date of Patent: Jul. 7, 1998

[54] METHOD AND CONTROL DEVICE FOR CONTROLLING A MATERIAL-PROCESSING PROCESS

[75] Inventors: Otto Gramckow, Erlangen; Thomas Martinetz; Thomas Poppe, both of München; Günter Sörgel, Nürnberg, all of Germany

[73] Assignee: Siemens Aktiengesellschaft, Munchen, Germany

[21] Appl. No.: 242,934

[22] Filed: May 16, 1994

[30] Foreign Application Priority Data

May 17, 1993 [EP] European Pat. Off. .............. 93108016

[51] Int. Cl.$^6$ ..................................................... G06F 15/18
[52] U.S. Cl. ............................ 395/22; 395/903; 395/906
[58] Field of Search .............................. 395/22, 903, 906

[56] References Cited

U.S. PATENT DOCUMENTS

| | | | |
|---|---|---|---|
| 5,119,468 | 6/1992 | Owens | 395/906 |
| 5,159,660 | 10/1992 | Lu et al. | 395/22 |
| 5,175,678 | 12/1992 | Frerichs et al. | 395/22 |
| 5,268,834 | 12/1993 | Sanner et al. | 395/22 |
| 5,303,385 | 4/1994 | Hattori et al. | 395/906 |
| 5,305,230 | 4/1994 | Matsumoto et al. | 395/906 |
| 5,311,421 | 5/1994 | Nomura et al. | 395/906 |
| 5,402,519 | 3/1995 | Inoue et al. | 395/22 |
| 5,406,581 | 4/1995 | Staib et al. | 373/104 |
| 5,444,819 | 8/1995 | Negishi | 395/22 |
| 5,479,358 | 12/1995 | Shimoda et al. | 364/492 |
| 5,513,097 | 4/1996 | Gramckow et al. | 395/903 |
| 5,559,690 | 9/1996 | Keeler et al. | 395/23 |
| 5,581,459 | 12/1996 | Enbutsu et al. | 395/22 |

FOREIGN PATENT DOCUMENTS

| | | |
|---|---|---|
| 0 460 892 | 12/1991 | European Pat. Off. . |
| 0 531 712 | 3/1993 | European Pat. Off. . |
| 40 08 510 | 9/1990 | Germany . |
| 0 534 221 | 3/1993 | Germany . |
| 41 31 765 | 3/1993 | Germany . |

OTHER PUBLICATIONS

IEE Proceedings D, Control Theory & Applications, vol. 138, No. 5, Sep. 1991, Stevenage, GB, pp. 431–438; K. Hunt et al.: *Neural Networks for Nonlinear Internal Model Control*.
Patent Abstracts of Japan, vol. 16, No. 467, 29 Sep. 1992 & JP-A-41 67 908 (Toshiba) 16 Jun. 1992.
Patent Abstracts of Japan, vol. 16, No. 515, 23 Oct. 1992 & JP-A-41 90 910 (Toshiba) 9 Jul. 1992.
WO90/10270 (PCT), Owen et al, Sep. 7, 1990.
Bleuler et al, "Non linear Neural Network Control with Application Example", INNC, Jul. 9–13, 1990.
Psaltis et al, "A Multilayered Neural Network Controller", IEEE, 1988.

*Primary Examiner*—George B. Davis
*Attorney, Agent, or Firm*—Kenyon & Kenyon

[57] ABSTRACT

In the control of a material-processing process in a regulated system, a preliminary adjustment of the system takes place at the beginning of each process cycle as a function of a precalculated process parameter. A material characteristic which is relevant for the process and which in turn is dependent on state variables (such as the composition of the material and its temperature), is included in an advance calculation of the process parameter. The relationship between the state variables and the material property is modelled in a neural network which forms a prediction value for the material property on its output side. As a function of the deviation between the prediction value and an actual value for the material property which is determined based on measuring the process parameter during the process cycle, an adaptive change of the network parameters takes place in the sense of reducing this deviation.

23 Claims, 2 Drawing Sheets

METHOD AND CONTROL DEVICE FOR CONTROLLING A MATERIAL-PROCESSING PROCESS

BACKGROUND OF THE INVENTION

The present invention relates to a method and control device for controlling a material-processing process in a regulated system, where a preliminary adjustment of the system takes place at the beginning of each process cycle as a function of a precalculated process parameter. More particularly, the present invention relates to such a preliminary adjustment, where a material characteristic, which is dependent on the state variables of the material (such as its composition and temperature), and which is relevant for the process, is included in this advance calculation.

In German Patent No. DE-A-41 31 765, the disclosure of which is hereby incorporated by reference in its entirety, a method and a control device is shown for controlling a process in an industrial system, such as a mill train. The actual control factor, namely the thickness of the rolling stock which exits from the system, cannot be measured in the roller gap (nip). Rather, the actual control factor can only be determined indirectly as a function of the setting factor, which is the setting of the screw-down position of the roller unit in question, and one or more process parameters, such as the rolling force. During the course of the process (i.e. during the passage of the material through the rollers), the rolling force can be measured, so that the actual value of the control factor can be calculated at any time and thus can be passed on to the control device to generate the setting factor. However, in the initial phase of each process cycle, in other words at the beginning of every rolling process, the control device has to adjust itself, which results in incorrect thicknesses in the starting region of the rolling stock. To minimize the transient phase of the control, and thus minimize the likelihood that the starting region of the rolling stock has an incorrect thickness, a preliminary adjustment of the setting factors takes place before the rolling stock enters the mill train. The preliminary adjustment of the setting factors is performed as a function of a reference value for the control factor (rolling stock thickness) and a precalculated value for the process parameter (rolling force). The precalculation of the rolling force takes place using a calculation model with which the dependence between the rolling force and input factors which influence it (such as width, thickness and temperature of the rolling stock) are modelled, and where reference values or estimated values are determined for the input factors, if no measurement values are available, yet. As soon as the rolling stock has entered the mill train, measurements of the rolling force and the input factors are taken. The measurement values obtained in this manner are processed within the scope of recalculation, for example statistically, and subsequently used for adaptive adjustment of the model to the recalculated factors.

In the precalculation of the process parameters for preliminary adjustment of material processing processes, the properties of the material to be processed furthermore play a decisive role. Depending on the type of process, the necessary preliminary adjustment depends on the specific heat, heat conductivity, viscosity, hardness, etc. of the material. For optimum preliminary adjustment of the process, it is therefore necessary to know the relevant material property at a given time in each instance. As a rule, however, the material property in question cannot be measured directly, but rather must be determined indirectly via the state variables of the material. Temperature, pressure and the chemical composition of the material are among the intensive (i.e., geometry-independent), thermodynamic state variables. If the material is in thermodynamic equilibrium, the actual values of the state variables at any particular time determine the material property which is relevant for the problem being considered. If the material is not in thermodynamic equilibrium, as is frequently the case, then in addition to the actual values of the state variables, the prior history of these values is also included in the material property. If the actual values of the state variables and, if necessary, also their previous historic values are available, then the material properties are established. In order to be able to predict these, based on the state variables, the physical relationship between the state variables and the material property in question must be known. Presently, one possibility for predicting the material property consists of modelling the relationship between the state variables and the material property in a computer device using a mathematical model. The model parameters are adapted as a function of measurements during the process. The physics of the materials to be processed, however, are generally too complex to be described with sufficient accuracy with physical models. Furthermore, the design of physical models is time-consuming, requiring measurement of the model parameters, and must also be repeated from the beginning for every type of material.

There is a need for a method and apparatus for predicting the material properties described above without making the creation of model assumptions necessary, and while achieving improved and excellent accuracy.

SUMMARY OF THE INVENTION

This and other needs are satisfied by the method and control device of the present invention. Pursuant to the invention, in a method of the type indicated above, the state variables are applied to a neural network with changeable network parameters before the start of the process cycle. Doing this forms a prediction value for the material property at the output. The process parameter is measured during the process cycle and an actual value for the material property is determined after the process cycle by recalculation. The network parameters are adaptively changed as a function of the deviation between the prediction value and the actual value of the material property to reduce this deviation. Accordingly, the control device for implementing the method of the present invention has a neural network with changeable network parameters for adaptive modelling of the dependence between the material property and the state variables.

With the present invention, the prediction of the material property takes place directly in each instance in a neural network which is self-learning based on the adaptation of the network parameters, without having to make any model assumptions for the connection between the state variables and the material property for this purpose. With this method, it is possible to achieve a significant improvement in prediction quality compared to previous methods.

Preferably, after every process cycle, the state variables are recalculated based on the measurements taken during the process cycle, and then passed to the neural network, where the deviation between the network response obtained and the actual value of the material properties is used for adaptation of the network parameters. Because the state variables, recalculated after the process cycle based on the measurements made, are used for the adaptation of the network parameters, instead of the original state variables, an increase in accuracy is achieved for the adaptation.

To guarantee step-by-step adaptation of the network parameters to the time-variant process (i.e., the process which changes from one cycle to the next) the adaptation of the network parameters is performed on-line, in that an adaptation of the network parameters takes place after every process cycle.

As mentioned above, the adaptation of the network parameters is carried out in the sense of reducing (i.e., minimizing) the deviation between the actual value determined and the prediction value for the material property. If other local minima exist outside of the related minimum, then the danger exists that the adaptation process will get stuck in one of these local minima. To prevent this, other deviations from prior process cycles can be used for adaptation of the network parameters after each individual process cycle, in addition to the current deviation between the network response and the actual value for the material property (batch training).

In accordance with a further embodiment of the method and control device of the present invention, the neural network is pre-adapted with simulated or operational process values for the state variables and the material property, before the very first process cycle.

The method according to the present invention can be used for different material-processing processes. An example is the melting of melt materials, where the material-specific melting energy can be predicted as a function of the composition of the material to be melted. The method of the present invention is particularly advantageous for controlling a rolling process, where a prediction of the material strength of the rolling stock takes place as the basis for an advance calculation of the rolling force by the neural network. In this embodiment, the concentrations of chemical elements, particularly Carbon (C), Silicon (Si), Manganese (Mn), Phosphorus (P), Sulfur (S), Aluminum (Al), Nitrogen (N), Copper (Cu), Chromium (Cr), Nickel (Ni), Tin (Sn), Vanadium (V), Molybdenum (Mo), Titanium (Ti), Niobium (Nb), and Boron (B) are used as the state variables of the rolling stock. However, since the effective material strength of the rolling stock also depends on other parameters such as temperatures and geometric dimensions of the rolling stock, as well as rolling speed, these other values are also used as state variables.

The neural network of the present invention has an input layer with one input element for each state variables. The input layer is followed by a hidden layer which comprises totaling elements, each of which totals the state variables. The totaling elements are provided with individual weight factors that are passed to it on the input side of the neural network. An answer is generated on the output side of the neural network from the total formed in this manner, according to a function with a sigmoid progression. The hidden layer is followed by an output layer with an output element which totals the answers of the elements of the hidden layer, each being provided with an individual weight factor to yield the prediction value.

It is advantageous if the input layer and the hidden layer each have an additional element to which a constant value is passed on the input side of the neural network.

In accordance with the methods of the present invention as described above, a control device is provided that corresponds to and implements these methods. In particular, the control device of the present invention can include a programmed computer device.

DETAILED DESCRIPTION

Figure 1:
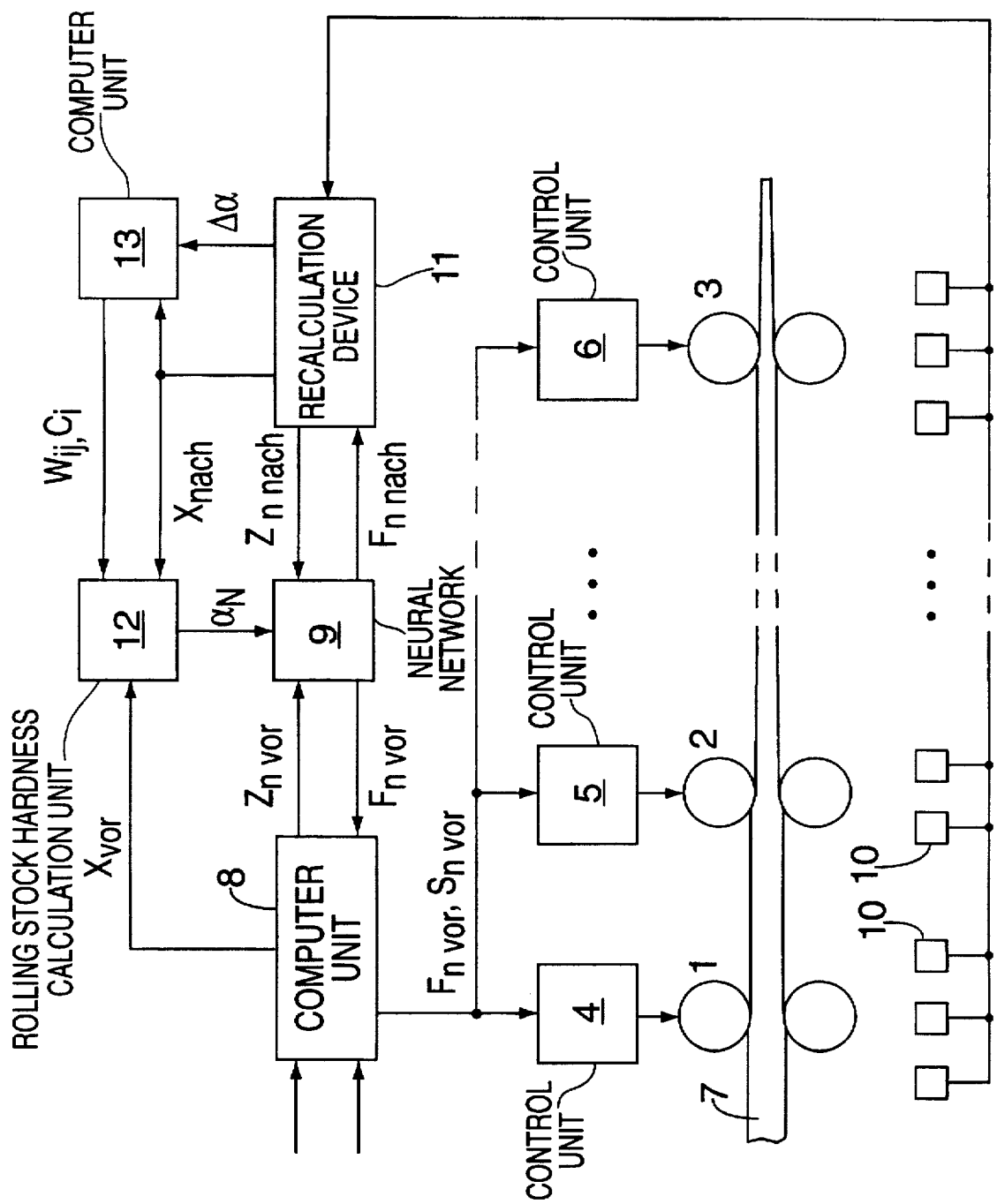
FIG. 1 is a block diagram of the control device according to the present invention.

Referring to FIG. 1, a highly schematic representation of a mill train is shown having a plurality of (e.g., three) rolling stands n (where n=1, 2, 3). A control unit 4, 5, 6 is assigned to each of the stands n to adjust the band thickness of the rolling stock 7 passing therethrough. In the example shown, the necessary rolling force $F_n$ (for each rolling stand) is determined at the stand n from the hardness of the rolling stock 7 as well as the following input factors: the relative thickness decrease $E_n$ of the rolling stock 7, the entry temperature $T_n$, of the rolling stock 7, the forward pull $Z_n$ in the rolling stock in front of the stand n, the backward pull $Z_{n+1}$ in the rolling stock 7 behind the stand n, the roller radius $R_n$, the band width $B_n$ and the entry thickness $D_n$ of the rolling stock 7 in front of the stand n.

The rolling force $F_n$ must be predicted before the rolling stock 7 enters the mill train. For this reason, some of the factors which determine the rolling force $F_n$ at the stand, such as the entry temperature $T_n$ or the entry thickness $D_n$, are not known, but rather must be estimated on the basis of model assumptions. This precalculation takes place in a computer unit 8 which controls the control units 4, 5, 6. The measured and precalculated input factors form an input vector $Z_{n\ vor}$ which is passed to a neural network unit 9 with a rolling force algorithm implemented in it assigned to the computer unit 8 for each individual stand n. Alternatively, the input vector $Z_{n\ vor}$ can be passed to a neural network for each individual stand n. The rolling force algorithm (i.e., the neural network), which has preferably already been pre-adapted on the basis of randomly generated input factors, generates a prediction value $F_{n\ vor}$ for the rolling force $F_n$ in each instance, and passes this result back to the computer unit 8. The computer unit 8 determines a preliminary adjustment in the form of a precalculated nip (load-free roller gap) $S_{n\ vor}$ for each rolling stand n, n=1, 2, 3, building up on this, and passes it to the control units 4, 5, and 6, in pairs, together with the precalculated rolling force $F_{n\ vor}$. As soon as the rolling stock 7 has run into the mill train and the rolling process has started, additional measurements can be taken using sensors 10 arranged along the mill train, which permit a significantly more accurate estimation of the input factors $E_n, T_n, Z_n, Z_{n+1}, R_n, B_n, D_n$, (hereinafter "$E_n, \ldots, D_n$") as well as the rolling force $F_n$ for each rolling stand n, in a subsequent recalculation device 11. The recalculation comprises, for example, statistical processing of the measured values (among them the rolling force), as well as calculation of factors that cannot be measured, such as the temperatures of the rolling stock 7 between the individual stands n as a function of the measured temperature in front of the first rolling stand and behind the last rolling stand.

With these recalculated factors, which are significantly more accurate in comparison with the advance calculation, an adaptation of the rolling force algorithm or the neural network is carried out in the unit 9 after the rolling process has ended, for the next rolling process. In this operation, the rolling force algorithm or the neural network models the process-related connection between the rolling force $F_n$ and the input factors $E_n, \ldots, D_n$. The method for the prediction of the rolling force $F_n$ using a neural network, which has been briefly described until this point, is the subject of the copending U.S. application Ser. No. 08/243,646 filed on May 16, 1994 and entitled "A METHOD AND A CONTROL DEVICE FOR CONTROLLING A PROCESS", the disclosure of which is hereby incorporated by reference.

As already mentioned above, the prediction of the rolling force $F_n$ presupposes a knowledge of the hardness of the rolling stock 7. To determine this, an additional unit (rolling stock hardness calculation unit 12) is provided with a neural network, which generates an output factor $\alpha_N$ describing the hardness of the material as a function of an input vector $X_{vor}$=(C, Si, Mn, P, S, Al, N, Cu, Cr, Ni, Sn, V, Mo, Ti, Nb, B, EBD, EBB, T1, T8) which is composed of several state variables. The state variables C, Si, Mn, . . . B indicate the concentrations of 16 chemical elements such as carbon, silicon, manganese, . . . and boron. The state variables EBD and EBB indicate the final thickness and the final width, and T1 and T8 indicate the temperatures of the rolling stock 7 before and after the rolling process. The hardness factor $\alpha_N$ which is determined in the unit 12 is passed to the unit 9 with the rolling force algorithm and thus is included in the calculation of the rolling force $F_n$. The adaptation of the neural network takes place in a further computer unit 13, as a function of direct or indirect measurements of the actual material hardness $\alpha_{nach}$ and the recalculated input vector $X_{nach}$, where in the latter case, the actual value of the material hardness is obtained by recalculation of the process factors measured by the sensors 10, in the recalculation device 11. The input vector $X_{vor}$ from the advance calculation and the one from the recalculation $X_{nach}$ are identical with regard to chemical composition, in any case.

Figure 2:
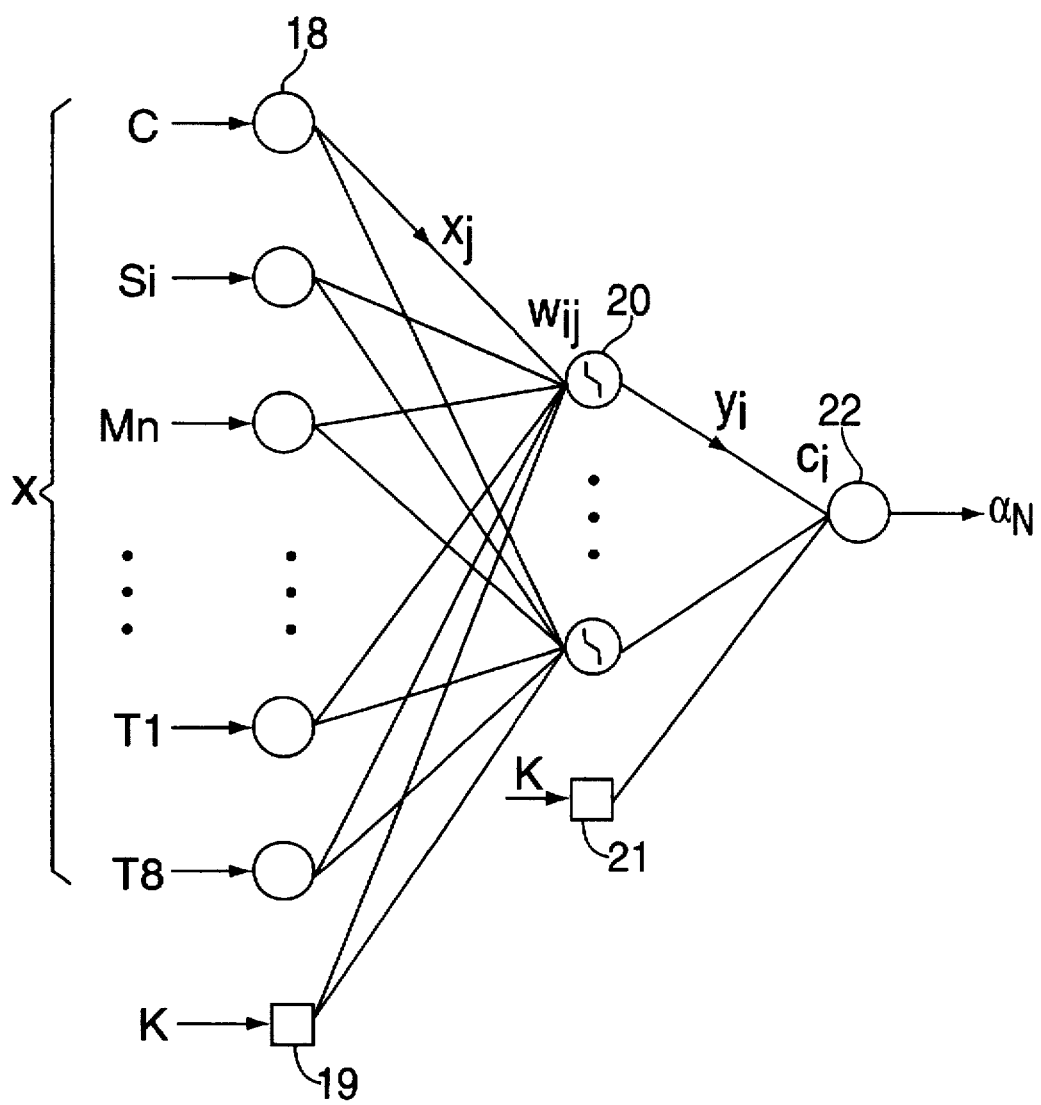
FIG. 2 is an example of the neural network of the present invention used in the control device of FIG. 1.

The neural network of the unit 12 shown in FIG. 2 includes an input layer which has twenty input elements 18, corresponding to the number of state variables C, . . . , T8. Before the twenty state variables C, . . . , T8 are passed to the neural network, standardization of the individual factors to the value range between zero and one takes place. Therefore, with this initial standardization, input factors that take on small numerical values are made equivalent to those input factors that take on high numerical values, right from the start, and enter into the adaptation process described below with the same weight. Aside from the input elements 18, the input layer has an additional input element 19, to which a constant value K (for example set to the value −1.0) is passed. The input layer is followed by a hidden layer, comprising several (in this case ten) totalling elements 20, each element 20 demonstrates a response behavior with a sigmoid progression between −1.0 and +1.0. The state variables $x_j$; j=1, . . . , 20 and $x_{21}$=K are totalled in each element 20 of the hidden layer. Each element 20 is provided with individual weight factors $w_{ij}$, i=1, . . . , 10, j=1, . . . , 21, and the value $$y_i = \tanh \sum_{j=1}^{21} w_{ij} \cdot x_j$$

is generated at the output side from the total formed in this manner with i=1, . . . , 10. The hidden layer has an additional element 21, which serves as the input element for a constant value $x_{21}$=K (e.g., K=−1.0), and generates a corresponding output signal $Y_{11}$=−1.0.

The hidden layer is followed by an output layer with an output element 22, which totals the answers $y_i$ of the elements 20 of the hidden layer, each with an individual weight factor $c_i$, to yield the prediction value $$\alpha_N = \sum_{i=1}^{11} c_i \cdot y_i$$

The on-line adaptation of the network parameters $w_{ij}$ and $c_i$ takes place after every rolling process (i.e. after every passage of rolling stock) in the computer unit 13 (shown in FIG. 1) based on the error function $$E_q = 1/2 \sum_{\mu=1}^{p} \Delta\alpha^2$$

with $$\Delta\alpha = \alpha^\mu_{nach} - \alpha^\mu_{N\ nach}$$

which is calculated from the recalculated actual values $\alpha^{82}_{nach}$ and the prediction values $\alpha^{82}_{N\ nach}$, µ=1, . . . , p of p selected rolled strips in each instance. The network parameters are changed in the direction of reducing the error $E_q$ using adaptation steps $\Delta w_{ij}$ and $\Delta c_i$. In this case, the adaptation steps $$\Delta W_{ij} = -l \cdot \partial E_q / \partial W_{ij}$$

$$\Delta C_i = -l \cdot \partial E_q / \partial C_i$$

obtained, where l designates the adaptation step width (i.e., the learning rate for each adaptation step). The learning rate l is preferably not kept constant, but rather recalculated for each adaptation step, for example according to the so-called line search method. In this manner, an adaptive modelling of the connection between the state variables takes place, represented by the input vector x and the material property (here the material hardness α) represented by the network output $\alpha_N$.

What is claimed is:

1. A method for controlling the processing of a material in a regulated system having at least one process cycle, the method comprising:

performing a preliminary adjustment of the regulated system at a beginning of each process cycle of the material-processing process as a function of a precalculated process parameter, wherein precalculation of said process parameter includes a material property that is relevant to said material-processing process and is also dependent on a plurality of state variables of said material;

applying said plurality of state variables to a neural network prior to the beginning of the process cycle, said neural network including variable network parameters;

forming in said neural network a prediction value for said material property at an output of said neural network;

measuring said process parameter during said process cycle;

determining an actual value of said material property after said process cycle by recalculation;

adaptively changing said variable network parameters as a function of a deviation between said prediction value and the actual value of the material property in order to reduce said deviation.

2. The method of claim 1, wherein after said process cycle said plurality of state variables are recalculated based on measurements taken during said process cycle and said recalculated state variables are passed to said neural network to generate a subsequent value as a network response, wherein a deviation between said network response of said neural network and the actual value of the material property is used to adapt said variable network parameters.

3. The method of claim 2, wherein adaptation of the variable network parameters of said neural network takes place on-line, such that adaptation of the variable network parameters takes place after every process cycle.

4. The method of claim 3, wherein deviations from prior process cycles are used to adapt the network parameters of said neural network after each individual process cycle, in addition to a current deviation between the network response and the actual value for the material property.

5. The method of claim 4 wherein said neural network is pre-adapted with simulated process values for the state variables and the material property before a first process cycle.

6. The method of claim 4 wherein said neural network is pre-adapted with operational process values for the state variables and the material property before the first process cycle.

7. The method of claim 5 wherein in a rolling process, said material characteristic is a material strength of a rolling stock in said rolling process and said process parameter is a rolling force of said rolling stock, such that a prediction of the material strength of the rolling stock takes place based on an advance calculation of the rolling force by said neural network.

8. The method of claim 7 wherein the state variables of said rolling stock are concentrations of chemical elements selected from the group of Carbon (C), Silicon (Si), Manganese (Mn), Phosphorus (P), Sulfur (S), Aluminum (Al), Nitrogen (N), Copper (Cu), Chromium (Cr), Nickel (Ni), Tin (Sn), Vanadium (V), Molybdenum (Mo), Titanium (Ti), Niobium (Nb), and Boron (B).

9. The method of claim 8, wherein said state variables include temperature, geometric dimensions of the rolling stock, and rolling speed.

10. The method of claim 9 wherein said neural network includes
    an input layer having an input element for each of said state variables,
    a hidden layer totaling said state variables in totaling elements with individual weight factors to form an answer at an output of said hidden layer according to a function with a sigmoid progression, and
    an output layer following said hidden layer having an output element totaling answers of the elements of the hidden layer, each with an individual weight factor to yield said prediction value.

11. The method according to claim 10 wherein the input layer and the hidden layer of said neural network each has an additional element for receiving a constant value on an input side for computation of the answers of the elements of said hidden layer and the prediction value of said output element.

12. A control device for controlling a material-processing process in a regulated system having at least one program cycle, comprising:
    a device for preliminary adjustment of the system at a beginning of each process cycle as a function of a precalculated process parameter, where a material property which is dependent on state variables of the material and which is relevant for the material-processing process, is included in the precalculation; and
    a neural network coupled to said device for preliminary adjustment having variable network parameters for adaptive modelling of a dependence between the material property and the state variables.

13. The control device of claim 12, wherein in said neural network a prediction value is formed for said material property at an output of said neural network, such that an actual value of said material property is determined by recalculation based on process parameters measured during said process cycle and said network parameters of said neural network are adaptively changed as a function of a deviation between the prediction value and the actual value of the material property in order to reduce said deviation.

14. The control device of claim 13, wherein after said process cycle said state variables are recalculated based on measurements taken during said process cycle, such that said recalculated state variables are passed to said neural network to generate a subsequent value as a network response, wherein a deviation between said network response of said neural network and the actual value of the material property is used to adapt said variable network parameters.

15. The control device of claim 14, wherein adaptation of the variable network parameters of said neural network takes place on-line, such that adaptation of the variable network parameters takes place after every process cycle.

16. The control device of claim 15 wherein deviations from prior process cycles are used to adapt the network parameters of said neural network after each individual process cycle, in addition to a current deviation between the network response and the actual value for the material property.

17. The control device of claim 16 wherein said neural network is pre-adapted with simulated process values for the state variables and the material property before a first process cycle.

18. The control device of claim 16 wherein said neural network is pre-adapted with operational process values for the state variables and the material property before the first process cycle.

19. The control device of claim 17 further comprising:
    a rolling process including a rolling stock, such that said material characteristic is a material strength of said rolling stock in said rolling process and said process parameter is a rolling force of said rolling stock, such that a prediction of the material strength of the rolling stock takes place based on an advance calculation of the rolling force by said neural network.

20. The control device of claim 19 wherein the state variables of said rolling stock are concentrations of chemical elements selected from the group of Carbon (C), Silicon (Si), Manganese (Mn), Phosphorus (P), Sulfur (S), Aluminum (Al), Nitrogen (N), Copper (Cu), Chromium (Cr), Nickel (Ni), Tin (Sn), Vanadium (V), Molybdenum (Mo), Titanium (Ti), Niobium (Nb), and Boron (B).

21. The control device of claim 20 wherein said state variables include temperature, geometric dimensions of the rolling stock, and rolling speed.

22. The control device of claim 21 wherein said neural network further comprises:
    an input layer having an input element for each of said state variables;
    a hidden layer, such that said state variables from said input layer are totaled in totaling elements of said hidden layer with individual weight factors to form an answer at an output of said hidden layer according to a function with a sigmoid progression; and
    an output layer, following said hidden layer, having an output element which totals answers of the elements of the hidden layer, each with an individual weight factor to yield said prediction value.

23. The control device of claim 22, wherein the input layer and the hidden layer of said neural network each has an additional element for receiving a constant value on an input side for computation of the answers of the elements of said hidden layer and the prediction value of said output element.

* * * * *